United States Patent
Hendry et al.

(10) Patent No.: US 10,162,529 B2
(45) Date of Patent: *Dec. 25, 2018

(54) DYNAMIC THREE-TIER DATA STORAGE UTILIZATION

(71) Applicant: Workday, Inc., Pleasanton, CA (US)

(72) Inventors: Peter George Hendry, Auckland (NZ); Jonathan David Ruggiero, Walnut Creek, CA (US)

(73) Assignee: Workday, Inc., Pleasanton, CA (US)

( * ) Notice: Subject to any disclaimer, the term of this patent is extended or adjusted under 35 U.S.C. 154(b) by 19 days.

This patent is subject to a terminal disclaimer.

(21) Appl. No.: 15/153,054

(22) Filed: May 12, 2016

(65) Prior Publication Data

US 2016/0259565 A1    Sep. 8, 2016

Related U.S. Application Data

(63) Continuation of application No. 13/763,557, filed on Feb. 8, 2013, now Pat. No. 9,396,131.

(51) Int. Cl.
*G06F 3/06* (2006.01)
*G06F 12/121* (2016.01)
*G06F 17/30* (2006.01)

(52) U.S. Cl.
CPC .......... *G06F 3/0608* (2013.01); *G06F 3/067* (2013.01); *G06F 3/0647* (2013.01); *G06F 3/0653* (2013.01); *G06F 3/0661* (2013.01); *G06F 12/121* (2013.01); *G06F 17/30082* (2013.01); *G06F 2212/401* (2013.01)

(58) Field of Classification Search
CPC .... G06F 3/0608; G06F 3/0647; G06F 3/0653; G06F 3/0661; G06F 3/067; G06F 12/121
See application file for complete search history.

(56) References Cited

U.S. PATENT DOCUMENTS

| | | | |
|---|---|---|---|
| 6,360,300 B1 * | 3/2002 | Corcoran | G06F 3/0608 |
| | | | 711/113 |
| 8,533,393 B1 | 9/2013 | Cote | |
| 2001/0047461 A1 | 11/2001 | Milillo et al. | |
| 2004/0193659 A1 * | 9/2004 | Carlson | G06F 17/3089 |
| 2006/0010154 A1 | 1/2006 | Prahlad | |
| 2006/0136525 A1 * | 6/2006 | Akelbein | G06F 3/0608 |
| 2008/0071748 A1 | 3/2008 | Wroblewski | |
| 2011/0040937 A1 | 2/2011 | Augenstein | |
| 2011/0082842 A1 * | 4/2011 | Groseclose, Jr. | G06F 3/0608 |
| | | | 707/693 |
| 2011/0231524 A1 | 9/2011 | Lin | |
| 2012/0185648 A1 | 7/2012 | Benhase | |
| 2012/0296883 A1 * | 11/2012 | Ganesh | G06F 17/30315 |
| | | | 707/693 |
| 2013/0185531 A1 * | 7/2013 | Emaru | G06F 3/061 |
| | | | 711/162 |
| 2013/0212349 A1 * | 8/2013 | Maruyama | G06F 12/00 |
| | | | 711/167 |

* cited by examiner

*Primary Examiner* — Nanci N Wong
(74) *Attorney, Agent, or Firm* — Van Pelt, Yi & James LLP

(57) ABSTRACT

A system for dynamically utilizing data storage comprises a processor and a memory. The processor is configured to determine whether a data storage criterion is satisfied; and, in the event that the data storage criterion is satisfied: determine a new archiving threshold based on a target data storage usage level; and set the archiving threshold. The memory is coupled to the processor and is configured to provide the processor with instructions.

20 Claims, 12 Drawing Sheets

DYNAMIC THREE-TIER DATA STORAGE UTILIZATION

CROSS REFERENCE TO OTHER APPLICATIONS

This application is a continuation of U.S. patent application Ser. No. 13/763,557, now U.S. Pat. No. 9,396,131, entitled DYNAMIC THREE-TIER DATA STORAGE UTILIZATION filed Feb. 8, 2013 which is incorporated herein by reference for all purposes.

BACKGROUND OF THE INVENTION

Modern database systems can contain very large amounts of data. As storage costs decrease, database systems take advantage of the easy availability of extra capacity, storing more and more data that might not have previously been deemed worthwhile to keep. A database storage system that stores too much data in its online transactional systems can suffer performance degradation due to processing overhead. A common method of addressing this difficulty is to separate the data storage between two systems, an online system that can access data more readily and an offline system that can store data without affecting the performance of the online system. When data from the offline system is required, it is requested and transferred to the online system. Determining which data are important enough to store in the online system is a very taxing job for a system administrator, and the division of data must be kept up to date as new data are added and usage patterns change.

BRIEF DESCRIPTION OF THE DRAWINGS

Various embodiments of the invention are disclosed in the following detailed description and the accompanying drawings.

DETAILED DESCRIPTION

Figure 1:
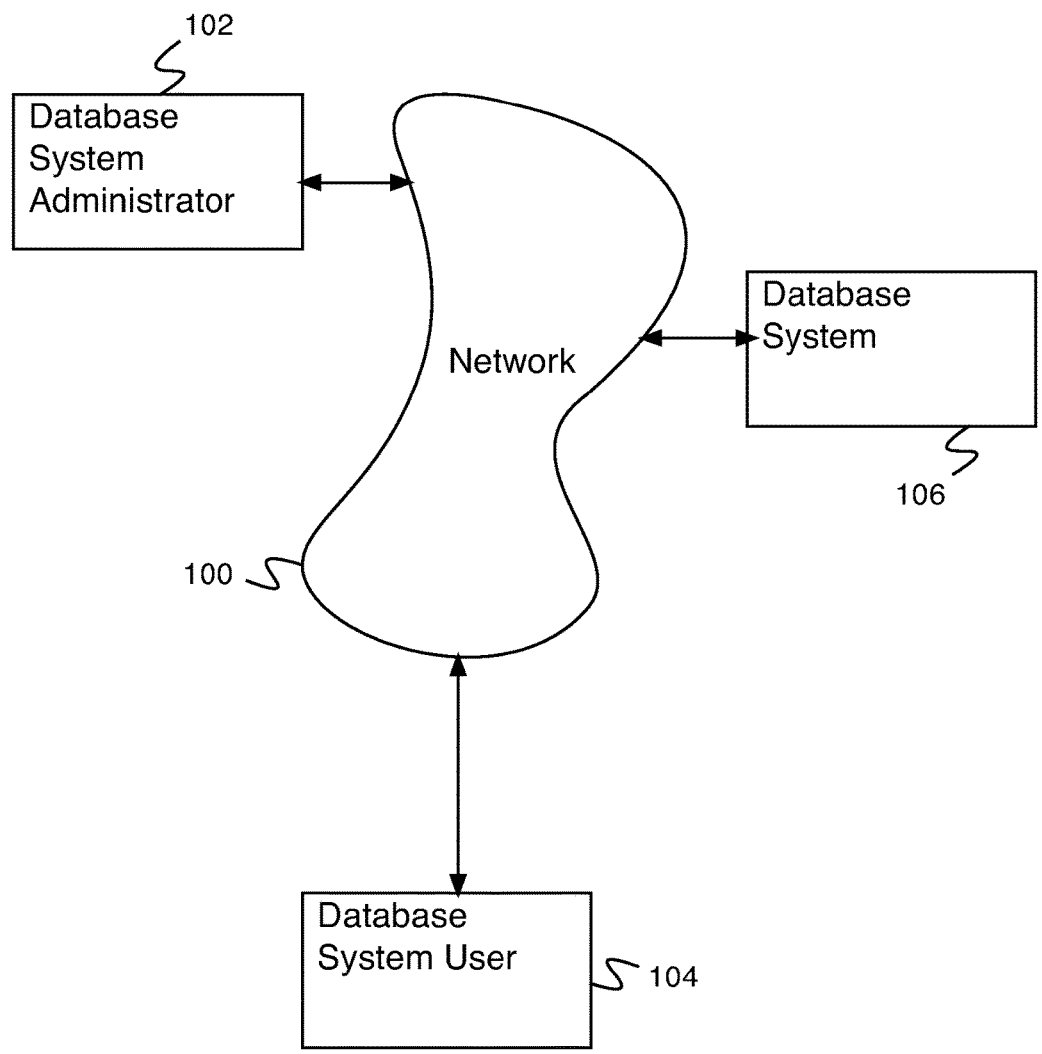
FIG. 1 is a block diagram illustrating an embodiment of a network system.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Dynamic data storage utilization is disclosed. A system for adjusting an archiving threshold comprises a processor and a memory. The processor is configured to: determine whether a first data storage criterion is satisfied; and in the event that the first data storage criterion is satisfied: determine a new first archiving threshold based on a first target usage level and set the first archiving threshold. The processor is additionally configured to: determine whether a second data storage criterion is satisfied; and in the event that the second data storage criterion is satisfied: determine a new second archiving threshold based on a second target usage level and set the second archiving threshold. The memory is coupled to the processor and is configured to provide the processor with instructions.

Data in a database system is stored divided between three data storage units. A first data storage stores uncompressed data within a transactional server (e.g., in randomly accessible memory (RAM), in a conventional hard drive, in a solid-state memory, in a multi-tiered memory, etc.). A second data storage stores compressed data within the transactional server (e.g., in RAM, in a conventional hard drive, in a solid-state memory, in a multi-tiered memory, etc.). In some embodiments, the first data storage and the second data storage comprise a single data storage device. In some embodiments, data objects are initially (e.g., upon system startup) stored as compressed objects in the second data storage. In some embodiments, data objects are initially stored as compressed objects in the second data storage and as uncompressed objects in the first data storage. A third data storage stores compressed data within a data server (e.g., in RAM, in a conventional hard drive, in a solid-state memory, in a multi-tiered memory, etc.). In some embodiments, the third data storage stores all database system data. In some embodiments, the third data storage stores only data with activity below a threshold.

The transaction server additionally comprises a transaction processing engine for processing transactions. The transaction processing engine comprises a local data storage for storing data during transaction processing. In some embodiments, the local data storage comprises a temporary data storage. In some embodiments, in the event that a data object is needed, the data object is copied from the first data storage to the local data storage and provided for use in transaction processing using a processor of the database system. In some embodiments, in the event that a data object is needed, the data object is copied from the second data storage to the local data storage, uncompressed, and provided for use in transaction processing using a processor of the database system. In some embodiments, in the event that a data object is needed, the data object is copied from the third data storage to the local data storage, uncompressed, and provided for use in transaction processing using a processor of the database system. In some embodiments, when transaction processing is complete, it is determined that the data object is to be stored in uncompressed format in the first data storage. In some embodiments, when transaction processing is complete, it is determined that the data object is to be compressed and stored in the second data storage. In some embodiments, when transaction processing is complete, it is determined that the data object is to be compressed and stored in the third data storage. In some embodiments, determining whether the data object is to be stored in uncompressed format in the first data storage, to be compressed and stored in the second data storage, or to be compressed and stored in the third data storage is performed using a keep threshold and an offloading threshold. In various embodiments, a keep threshold comprises an activity threshold, a performance threshold, or any other appropriate threshold. In various embodiments, an offloading threshold comprises an activity threshold, a performance threshold, or any other appropriate threshold. In some embodiments, an activity threshold comprises a threshold based on a usage amount (e.g., access per time period, accesses per day, accesses per hour, etc.). In some embodiments, a performance threshold comprises a threshold based on processing capability (e.g., transactions completed per minute, calculations per hour, accesses per day, etc.).

In some embodiments, memory is reclaimed on the first data storage device. In some embodiments, memory is reclaimed on the first data storage device using a first archiving threshold. In various embodiments, a first archiving threshold comprises an activity threshold, a performance threshold, or any other appropriate threshold. In some embodiments, the first archiving threshold is determined on the fly (e.g., dynamically, continuously, periodically, etc.). In some embodiments, the first archiving threshold is determined in response to a data storage criterion being satisfied. In some embodiments, determining whether a data storage criterion is satisfied comprises determining whether a server storage is above a threshold. In various embodiments, determining whether a server storage is above a threshold occurs at one of the following: continuously, periodically, at a fixed time, at a regular interval, or at any other appropriate time. A threshold data capacity (e.g., an upper bound) and a target data capacity (e.g., optimum capacity or desired capacity utilization of a data storage) less than the threshold data capacity for the first data storage are received (e.g., specified by a user, preset, default set, etc.).

In some embodiments, if the threshold data capacity is reached, data objects stored in the first data storage are analyzed. It is first determined how much data to remove from the first data storage to reach the target data capacity. It is then determined, using the current usage patterns, a first archiving threshold that will result in a sufficient number of data objects archived to remove the desired amount of data. In some embodiments, determining the new first archiving threshold comprises determining a set of objects to remove to meet the target data storage usage level. For example, each object is associated with an activity level and the objects are put in an ordered list by activity level. Either serially or in parallel, for a given first archiving threshold, the system determines the objects that are above the threshold and the storage space required to store those objects. The first archiving threshold that, when selected, would closest achieve the target data capacity is indicated to be selected. In some embodiments, the first archiving threshold that, when selected, would achieve a memory usage just below the target data capacity is indicated to be selected. The first archiving threshold is then set to the new value. In various embodiments, the first data storage is then processed to archive all data objects with activity below the first archiving threshold; data objects are left on the first data storage when the first archiving threshold is changed and are archived at a predetermined time; data objects are left on the first data storage when the first archiving threshold is changed and are archived when other processing activity is below a threshold, or data objects are archived at any other appropriate time.

In some embodiments, memory is reclaimed on the second data storage device. In some embodiments, memory is reclaimed on the second data storage device using a second archiving threshold. In various embodiments, a second archiving threshold comprises an activity threshold, a performance threshold, or any other appropriate threshold. In some embodiments, the second archiving threshold is determined on the fly (e.g., dynamically, continuously, periodically, etc.). In some embodiments, the second archiving threshold is determined in response to a data storage criterion being satisfied. In some embodiments, determining whether a data storage criterion is satisfied comprises determining whether a server storage is above a threshold. In various embodiments, determining whether a server storage is above a threshold occurs at one of the following: continuously, periodically, at a fixed time, at a regular interval, or at any other appropriate time. A threshold data capacity (e.g., an upper bound) and a target data capacity (e.g., optimum capacity or desired capacity utilization of a data storage) less than the threshold data capacity for the second data storage are received (e.g., specified by a user, preset, default set, etc.).

In some embodiments, if the threshold data capacity is reached, data objects stored in the second data storage are analyzed. It is first determined how much data to remove from the second data storage to reach the target data capacity. It is then determined, using the current usage patterns, a second archiving threshold that will result in a sufficient number of data objects archived to remove the desired amount of data. In some embodiments, determining the new second archiving threshold comprises determining a set of objects to remove to meet the target data storage usage level. For example, each object is associated with an activity level and the objects are put in an ordered list by activity level. Either serially or in parallel, for a given second archiving threshold, the system determines the objects that are above the threshold and the storage space required to store those objects. The second archiving threshold that, when selected, would closest achieve the target data capacity is indicated to be selected. In some embodiments, the second archiving threshold that, when selected, would achieve a memory usage just below the target data capacity is indicated to be selected. The second archiving threshold is then set to the new value. In various embodiments, the second data storage is then processed to archive all data objects with activity below the second archiving threshold; data objects are left on the second data storage when the second archiving threshold is changed and are archived at a predetermined time; data objects are left on the first data storage when the second archiving threshold is changed and are archived when other processing activity is below a threshold, or data objects are archived at any other appropriate time.

In some embodiments, a performance metric is monitored (e.g., continuously, periodically, etc.). Determining whether a data storage criterion is satisfied comprises determining whether a performance metric criterion is satisfied. A table or model is used to relate data storage usage and performance as measured by the metric. For example, transaction processing rate, data storage access time, calculation speed of the system are related to data storage usage (e.g., stored objects as a percentage of the first data storage total capacity). In the event that the performance metric dips below a performance threshold, the system determines based on the model or table, the data storage usage to achieve the target performance. The system indicates that this data storage usage is the new target and removes objects from the first data storage by archiving the objects to a second data storage or removes objects from the second data storage by archiving the objects to a third data storage. In some embodiments, the objects are selected based on their activity level. In some embodiments, objects are selected based on their last access time. In some embodiments, objects are selected based on a combination of their last access time and activity level.

In some embodiments, time is divided into N 'ticks'. A tick does not necessarily map to a time period—it could map to an amount of memory consumption (for example, if the difference between the lower and upper thresholds is 8 GB and we have 16 ticks then we could advance the tick each time 0.5 GB is consumed). In some embodiments, time starts at tick 0. An object is marked with the last tick in which it was accessed. An access count is kept for the object and the last tick it was accessed in. The higher the tick value of an object the more recently it was accessed. An object has only 1 tick value at any time and that value will move only upwards. When cleaning up, the tick value of each object is used to identify the objects more recently accessed to get us close to the reclaim target—for example, examining from tick 0 forward calculating how much memory reclaiming objects last accessed in that tick would reclaim. Once the segment is found which would push the system over the memory target that is being looked for, the segment is examined and the threshold approach is applied using the access counts to first work out a threshold that would reclaim enough objects to satisfy the memory target, and then use that threshold when reclaiming the objects. Future ticks (after the one determined to provide enough reclaimed memory) have no objects reclaimed and the tick values for those objects are reset to 0 and the cycle starts again.

FIG. 1 is a block diagram illustrating an embodiment of a network system. In the example shown, the network system comprises database system administrator 102, database system user 104, and database system 106, communicating via network 100. In various embodiments, network 100 comprises one or more of the following: a local area network, a wide area network, a wired network, a wireless network, the Internet, or any other appropriate network. Database system 106 comprises a database system for storage and retrieval of information. In some embodiments, database system 106 comprises a system for analysis of information. In some embodiments, database system 106 comprises a distributed database, e.g., a database system comprising multiple computers not necessarily in the same location. In some embodiments, database system 106 comprises a system for executing business processes. In some embodiments, database system 106 comprises a system comprising dynamic offloading of data storage utilization.

Database system administrator 102 comprises a database system administrator administrating database system 106. In some embodiments, database system administrator 102 comprises an employee at a company purchasing database system services. In some embodiments, administrating database system 106 comprises preparing, configuring, or modifying database system 106 as desired by database system users (e.g., database system user 104). In some embodiments, database system administrator 102 configures and modifies database system 106 in ways not available to database system user 104. Database system user 104 comprises a database user accessing database services on database system 106. In some embodiments, database system user 104 comprises a user who uses a user interface (e.g., a keyboard, a touch screen, a display, etc.) to interact with database system 106. In various embodiments, the user interface is associated with a desktop computer, a laptop computer, a local terminal, or any other appropriate system with a user interface. In some embodiments, database system user 104 comprises an employee at a company purchasing database system services. In various embodiments, there is/are 1, 2, 4, 13, 22, 115, or any other appropriate number of database system users accessing database services on database system 106. In some embodiments, each database system user only has access to their own data stored on database system 106 and is able to utilize database system 106 as though they are the sole database system user. For example, the system is a tenanted system where each tenant is only able to access their own data. In some embodiments, a tenant or user associated with the tenant has access to tenant specific objects as well as universally or system accessible objects. In some embodiments, database system user 104 configures services on database system 106. In some embodiments, the ability of database system user 104 to configure database system 106 is limited compared with that of database system administrator 102. In some embodiments, a database system user (e.g., database system user 104) comprises a person accessing database system 106 via a user interface, e.g., a web page. In some embodiments, a database system user comprises an automated system accessing database system 106 via a machine interface, e.g., a public application programming interface (API).

Figure 2:
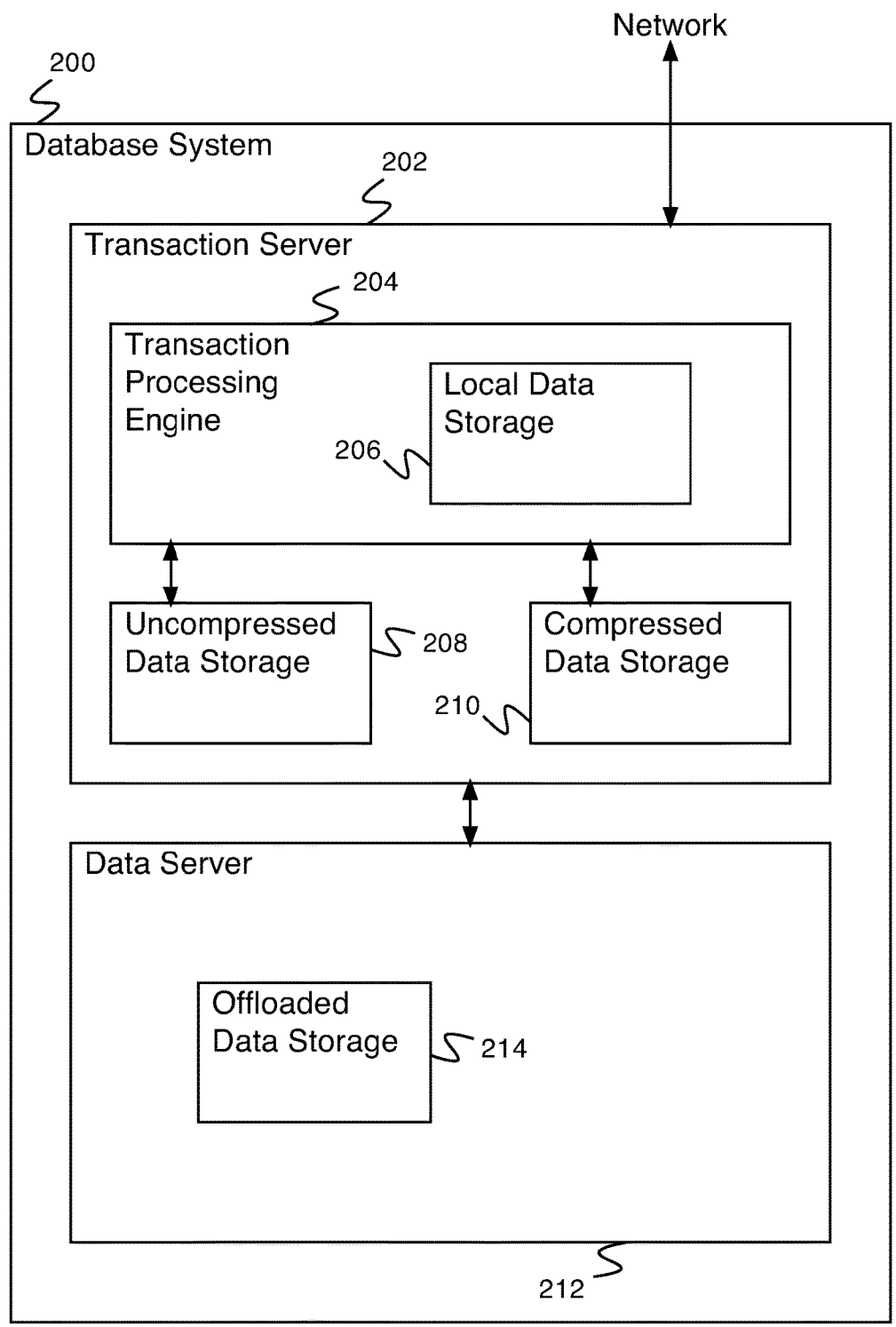
FIG. 2 is a block diagram illustrating an embodiment of a database system.

FIG. 2 is a block diagram illustrating an embodiment of a database system. In some embodiments, database system 200 comprises database system 106 of FIG. 1. In the example shown, transaction server 202 communicates with a network, e.g., network 100 of FIG. 1. Transaction server 202 comprises a system for responding to transaction requests. In various embodiments, transaction requests comprise data requests, sorted data requests, filtered data requests, data modification requests, data entry requests, or any other appropriate transaction requests. Transaction server 202 comprises transaction processing engine 204. Transaction processing engine 204 comprises an engine for processing transaction requests, e.g., transaction requests received over the network. Transaction processing engine 204 additionally comprises local data storage 206. Local data storage 206 comprises a local data storage for storing data while it is used by transaction processing engine 204.

Uncompressed data storage 208 comprises data storage utilized by transaction processing engine for processing transaction requests. In some embodiments, if a transaction request comprising a data request comprises a data request for data stored on uncompressed data storage 208, transaction processing engine 204 retrieves the requested data from uncompressed data storage 208 and stores the data in local data storage 206. In some embodiments, uncompressed data storage 208 has unlimited capacity (e.g., additional capacity can be added whenever the available capacity is filled). In some embodiments, there is a practical limit to the capacity of uncompressed data storage 208 (e.g., past a certain capacity the performance of transaction processing engine 204 falls to an unacceptable level). When there is a limit to the capacity of uncompressed data storage 208, data exceeding the capacity of uncompressed data storage 208 must be stored in another location.

Transaction server 202 additionally comprises compressed data storage 210. Compressed data storage 210 stores data in compressed format. In some embodiments, compressed data storage 210 comprises a backup or auxiliary copy of data stored in uncompressed data storage 208. In some embodiments, compressed data storage 210 can store data without the practical capacity limit of uncompressed data storage 208 (e.g., the amount of data stored in compressed data storage 210 does not affect the performance of transaction processing engine 204). In some embodiments, compressed data storage 210 has unlimited capacity (e.g., additional capacity can be added whenever the available capacity is filled). In some embodiments, uncompressed data storage 208 stores database data (e.g., data accessed by transaction processing engine 204) up to its practical capacity and compressed data storage 210 stores overflow database data (e.g., database data past the practical capacity of uncompressed data storage 208). In some embodiments, there is a practical limit to the capacity of compressed data storage 210 (e.g., past a certain capacity the performance of transaction processing engine 204 falls to an unacceptable level). When there is a limit to the capacity of compressed data storage 210, data exceeding the capacity of compressed data storage 210 must be stored in another location. In some embodiments, compressed data storage 210 stores all database data stored by database system 200 and uncompressed data storage 208 stores a subset of the data stored in compressed data storage 210. In some embodiments, the subset of data stored in compressed data 210 that is also stored in uncompressed data storage 208 is a predetermined subset of data indicated e.g., by a list of data elements to store in uncompressed format. In some embodiments, uncompressed data storage 208 and compressed data storage 210 store data as a collection of data objects. In some embodiments, data objects stored in uncompressed data storage 208 are stored in a data structure relating to their content, e.g., in a tree, graph, or other appropriate data structure. In some embodiments, data objects stored in compressed data storage 210 are stored in a data structure optimized for efficient storage of a large number of data objects, and not necessarily related to their content. In some embodiments, when data objects requested by transaction processing engine 204 are stored on compressed data storage 210 but not on uncompressed data storage 208, the data objects are requested from compressed data storage 210 by transaction processing engine 204, uncompressed, and stored in local data storage 206.

Database system 200 additionally comprises data server 212. Data server 202 comprises offloaded data storage 214. In some embodiments, offloaded data storage 214 comprises a data storage for storing data. In some embodiments, uncompressed data storage 208 and compressed data storage 210 store data up to their practical capacity and offloaded data storage stores overflow data (e.g., data past the combined practical capacity of uncompressed data storage 208 and compressed data storage 210). In some embodiments, offloaded data storage 214 comprises a backup or auxiliary copy of data stored in uncompressed data storage 208 and compressed data storage 210. In some embodiments, offloaded data storage 214 can store data without the practical capacity limit of uncompressed data storage 208 or compressed data storage 210 (e.g., the amount of data stored in offloaded data storage 214 does not affect the performance of transaction processing engine 204). In some embodiments, offloaded data storage 214 has unlimited capacity (e.g., additional capacity can be added whenever the available capacity is filled). In some embodiments, offloaded data storage 214 stores all database data stored by database system 200. In some embodiments, offloaded data storage 214 stores database data with activity below an activity threshold. In some embodiments, data objects stored in compressed data storage 210 are stored in a data structure optimized for efficient storage of a large number of data objects, and not necessarily related to their content. In some embodiments, when data objects requested by transaction processing engine 204 are stored on offloaded data storage 214 but not on compressed data storage 210 or uncompressed data storage 208, the data objects are requested from offloaded data storage 214 by transaction processing engine 204, uncompressed, and stored in local data storage 206.

In some embodiments, when the transaction processing engine 204 needs data stored in offloaded data storage 214, it is copied to local data storage 206, decompressed, and used. This is the "swapping in" of offloaded data for transaction processing. When transaction processing is complete, the data either gets discarded again, or, if the data object usage is above the offloading threshold, the data object is stored in compressed data storage 210.

In some embodiments, when transaction processing is complete, if the usage of a data object stored in local data storage 206 is above a keep threshold, the data object is stored in uncompressed data storage 208 and deleted from local data storage 206. In some embodiments, the data object is additionally deleted from compressed data storage 210. In some embodiments, the data object is additionally deleted from offloaded data storage 214. In some embodiments, the data object is not deleted from offloaded data storage 214. In some embodiments, when transaction processing is complete, if the usage of a data object stored in local data storage 206 is below an offloading threshold, the data object is stored in offloaded data storage 214 and deleted from local data storage 206. In some embodiments, when transaction processing is complete, if the usage of a data object stored in local data storage 206 is above an offloading threshold but below a keep threshold, the data object is stored in compressed data storage 210 and deleted from local data storage 206. In some embodiments, when a system is initialized (e.g., started up), all database data is stored in compressed data storage 210 and none is stored in uncompressed data storage 208, and uncompressed data storage 208 is filled as data objects are requested by transaction processing engine 204 and found to have usage above the keep threshold. In some embodiments, when a system is initialized (e.g., started up), a predetermined subset of data indicated e.g., by a list of data objects is transferred from compressed data storage 210 to uncompressed data storage 208, uncompressed, and stored. In some embodiments, when transaction processing is complete, if the usage of a data object stored in local data storage 206 is not above a keep threshold, the data object is compressed and stored in compressed data storage 210 and deleted from local data storage 206. In some embodiments, when transaction processing is complete, if the usage of a data object stored in local data storage 206 is not above a keep threshold, the data object is additionally deleted from uncompressed data storage 208. In some embodiments, a keep threshold is based at least in part on an archiving threshold. In various embodiments, a keep threshold comprises the number of times stored data was accessed in a given day, a frequency of stored data access, or any other appropriate activity threshold. In some embodiments, a keep threshold is manually determined, e.g., is set by a system designer or a system administrator (e.g., database system administrator 102 of FIG. 1). In some embodiments, a keep threshold is set dynamically.

In some embodiments, when a system is initialized (e.g., started up), offloaded data storage 214 is empty, and offloaded data storage 214 is filled as data objects are requested by transaction processing engine 204 and found to have below the offloading threshold. In some embodiments, when a system is initialized (e.g., started up), offloaded data storage 214 stores all database data. In some embodiments, when a system is initialized (e.g., started up), offloaded data storage 214 stores a predetermined set of database data.

In some embodiments, data objects stored in compressed data storage 210 comprise an indicator indicating whether, after transaction processing is complete, they should be left in uncompressed format and transmitted to uncompressed data storage 208, compressed and transmitted to compressed data storage 210, or compressed and transmitted to offloaded data storage 214. In some embodiments, an indicator indicating whether data objects should be transmitted to uncompressed data storage 208, compressed and transmitted to compressed data storage 210, or compressed and transmitted to offloaded data storage 214 once a transaction is complete is set based on a keep threshold and an offloading threshold.

When the system is configured (e.g., by database system administrator 102 of FIG. 1), a storage threshold value and a storage target value are set for each of uncompressed data storage 208 and compressed data storage 210. At predetermined intervals (e.g., once an hour, once a day, once a week, each time data is stored, etc.), it is determined whether uncompressed data storage 208 has more data stored than the uncompressed storage threshold value. If it is determined that more data is stored than the uncompressed storage threshold value, a new first archiving threshold is determined. A new first archiving threshold is determined by examining the activity of data objects stored in uncompressed data storage 208 and setting the first archiving threshold such that enough data objects will be removed so the amount of data stored in uncompressed data storage 208 will fall to the uncompressed storage target value. In some embodiments, when the new first archiving threshold is determined, data objects stored in uncompressed data storage 208 are examined, and any data object which has activity below the first archiving threshold is immediately removed from uncompressed data storage 208.

At predetermined intervals (e.g., once an hour, once a day, once a week, each time data is stored, etc.), it is determined whether compressed data storage 210 has more data stored than the compressed storage threshold value. If it is determined that more data is stored than the compressed storage threshold value, a new second archiving threshold is determined. A new second archiving threshold is determined by examining the activity of data objects stored in compressed data storage 210 and setting the second archiving threshold such that enough data objects will be removed so the amount of data stored in compressed data storage 210 will fall to the compressed storage target value. In some embodiments, when the new second archiving threshold is determined, data objects stored in compressed data storage 210 are examined, and any data object which has activity below the second archiving threshold is immediately removed from compressed data storage 210.

In some embodiments, a server has "metadata" about objects. Some metadata is design-time (i.e., defining how a specific object should be handled in all cases, etc.). Other metadata is runtime, which is how we would track the access count for each data instance. So, the server really has a bit of info about each data instance at runtime that tracks its access count.

In some embodiments, when the first archive threshold is determined objects are or are not marked to be removed or not removed. In some embodiments, the first archive threshold is compared against the current activity indicator on the object and as that is done the object is either removed or kept. In some embodiments, there are two passes—one to mark objects and the other to remove them. In some embodiments, the first archive threshold comprises some simple numeric value. In some embodiments, the first archive threshold comprises a combination of criteria (e.g., most recently accessed, least recently used, access count, access frequency, etc.).

In some embodiments, when the second archive threshold is determined objects are or are not marked to be removed or not removed. In some embodiments, the second archive threshold is compared against the current activity indicator on the object and as that is done the object is either removed or kept. In some embodiments, there are two passes—one to mark objects and the other to remove them. In some embodiments, the second archive threshold comprises some simple numeric value. In some embodiments, the second archive threshold comprises a combination of criteria (e.g., most recently accessed, least recently used, access count, access frequency, etc.).

Figure 3A:
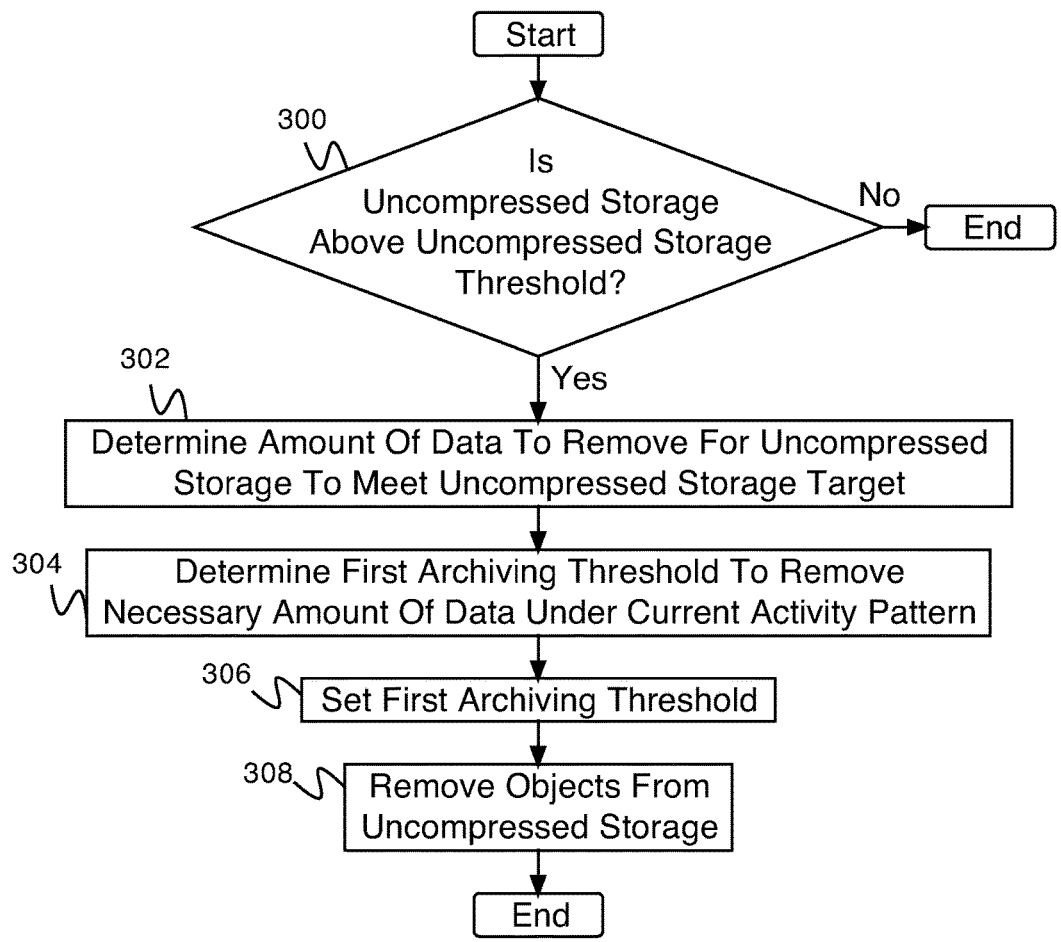
FIG. 3A is a flow diagram illustrating an embodiment of a process for archiving.

FIG. 3A is a flow diagram illustrating an embodiment of a process for archiving. In some embodiments, the process for archiving comprises dynamically setting a first archiving threshold. In some embodiments, dynamic offloading of data storage utilization comprises dynamically setting a first archiving threshold. In some embodiments, the process of FIG. 3A is executed by a transaction server (e.g., by transaction server 202 of FIG. 2). In some embodiments, the process of FIG. 3A is executed at predetermined intervals (e.g., once an hour, once a day, once a week, each time data is stored, etc.). In the example shown, in 300, it is determined whether uncompressed storage (e.g., uncompressed data storage 208 of FIG. 2) is above the uncompressed storage threshold (e.g., a storage threshold determined by database system administrator 102 of FIG. 1). In various embodiments, determining whether uncompressed storage is above the uncompressed storage threshold occurs continuously, periodically, at a fixed time, at regular interval, or any other appropriate time. In some embodiments, determining whether uncompressed storage is above the uncompressed storage threshold comprises determining whether a data storage criterion is satisfied. In some embodiments, determining whether uncompressed storage is above the uncompressed storage threshold comprises determining whether a storage usage is above a threshold. In some embodiments, determining whether uncompressed storage is above the uncompressed storage threshold comprises determining whether a performance metric criterion is satisfied. A table or model is used to relate uncompressed data storage usage and performance as measured by the metric. If it is determined that uncompressed storage is not above the uncompressed storage threshold, the process ends. If it is determined that uncompressed storage is above the uncompressed storage threshold, control passes to 302. In 302, the amount of data to remove for uncompressed storage to meet the uncompressed storage target (e.g., a storage target determined by database system administrator 102 of FIG. 1) is determined. In some embodiments, a storage target comprises a target usage level. In 304, a first archiving threshold to remove the necessary amount of data (e.g., the amount of data determined in 302) is determined. In some embodiments, a first archiving threshold comprises an activity threshold. In various embodiments, a first archiving threshold comprises the number of times stored data was accessed in a given day, a frequency of stored data access, or any other appropriate activity threshold. Increasing the first archiving threshold will reduce the number of objects that meet it, reducing the number of objects stored in uncompressed data storage 208 of FIG. 2 after archiving. In some embodiments, the first archiving threshold is determined by ordering objects stored in uncompressed storage by activity level and determining the first archiving threshold to remove the necessary amount of data (e.g., the total data comprised by objects below the first archiving threshold is as close as possible the amount of data determined in 302). In some embodiments, the first archiving threshold is determined by determining the amount of data that would be removed for one or more test first archiving thresholds and choosing the first archiving threshold that removes the closest to the necessary amount of data (e.g., amount of data determined in 302). In 306, the first archiving threshold is set (e.g., the first archiving threshold determined in 304 is stored as the new first archiving threshold). In 308, objects are removed from the uncompressed storage. In some embodiments, objects that do not meet the first archiving threshold are removed from the uncompressed storage.

Figure 3B:
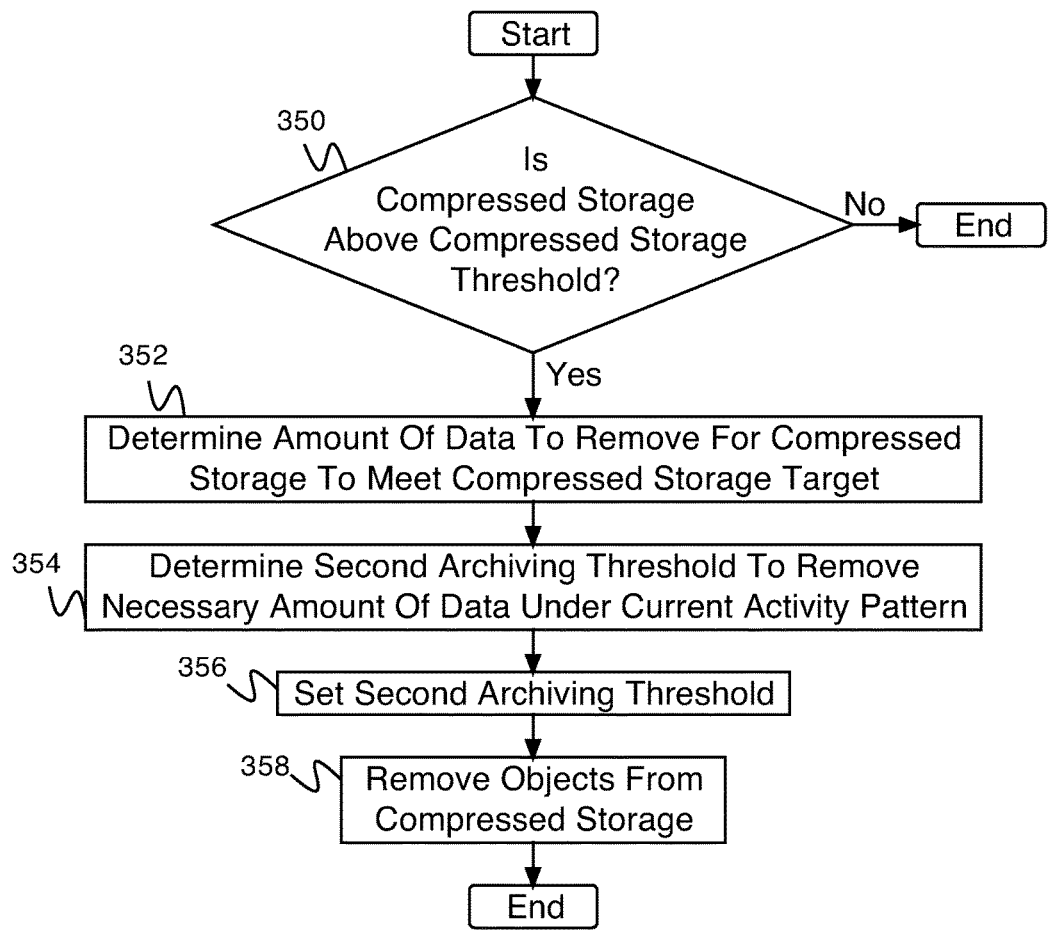
FIG. 3B is a flow diagram illustrating an embodiment of a process for archiving.

FIG. 3B is a flow diagram illustrating an embodiment of a process for archiving. In some embodiments, the process for archiving comprises dynamically setting a second archiving threshold. In some embodiments, dynamic offloading of data storage utilization comprises dynamically setting a second archiving threshold. In some embodiments, the process of FIG. 3B is executed by a transaction server (e.g., by transaction server 202 of FIG. 2). In some embodiments, the process of FIG. 3B is executed at predetermined intervals (e.g., once an hour, once a day, once a week, each time data is stored, etc.). In the example shown, in 350, it is determined whether compressed storage (e.g., compressed data storage 210 of FIG. 2) is above the compressed storage threshold (e.g., a storage threshold determined by database system administrator 102 of FIG. 1). In various embodiments, determining whether compressed storage is above the compressed storage threshold occurs continuously, periodically, at a fixed time, at regular interval, or any other appropriate time. In some embodiments, determining whether compressed storage is above the compressed storage threshold comprises determining whether a data storage criterion is satisfied. In some embodiments, determining whether compressed storage is above the compressed storage threshold comprises determining whether a storage usage is above a threshold. In some embodiments, determining whether compressed storage is above the compressed storage threshold comprises determining whether a performance metric criterion is satisfied. A table or model is used to relate compressed data storage usage and performance as measured by the metric. If it is determined that compressed storage is not above the compressed storage threshold, the process ends. If it is determined that compressed storage is above the compressed storage threshold, control passes to 352. In 352, the amount of data to remove for compressed storage to meet the compressed storage target (e.g., a storage target determined by database system administrator 102 of FIG. 1) is determined. In some embodiments, a storage target comprises a target usage level. In 354, a second archiving threshold to remove the necessary amount of data (e.g., the amount of data determined in 352) is determined. In some embodiments, a second archiving threshold comprises an activity threshold. In various embodiments, a second archiving threshold comprises the number of times stored data was accessed in a given day, a frequency of stored data access, or any other appropriate activity threshold. Increasing the second archiving threshold will reduce the number of objects that meet it, reducing the number of objects stored in compressed data storage 208 of FIG. 2 after archiving. In some embodiments, the second archiving threshold is determined by ordering objects stored in compressed storage by activity level and determining the second archiving threshold to remove the necessary amount of data (e.g., the total data comprised by objects below the second archiving threshold is as close as possible the amount of data determined in 352). In some embodiments, the second archiving threshold is determined by determining the amount of data that would be removed for one or more test second archiving thresholds and choosing the second archiving threshold that removes the closest to the necessary amount of data (e.g., amount of data determined in 352). In 356, the second archiving threshold is set (e.g., the second archiving threshold determined in 354 is stored as the new second archiving threshold). In 358, objects are removed from the compressed storage. In some embodiments, objects that do not meet the second archiving threshold are removed from the compressed storage.

In some embodiments, the first and second archive thresholds are not stored. The first and second archive thresholds are dynamic values which have a one-off use while clearing objects for a specific cleanup run. They do not persist and get used going forward. In some embodiments, there are multiple thresholds at work. The first is a keep threshold at which we transition an object from compressed to being kept uncompressed (the keep threshold)—this threshold may be adjusted after cleanup based on something like the time between cleanups (move up or down to adjust towards a target time). There is additionally an offloading threshold at which we transition an object from compressed to being kept offloaded. Then there are the first and second archive thresholds which are calculated for recompression and offloading activities and then discarded. The first archive threshold could be used as an input when recalculating the keep threshold. The second archive threshold could be used as an input when recalculating the offloading threshold.

Figure 4A:
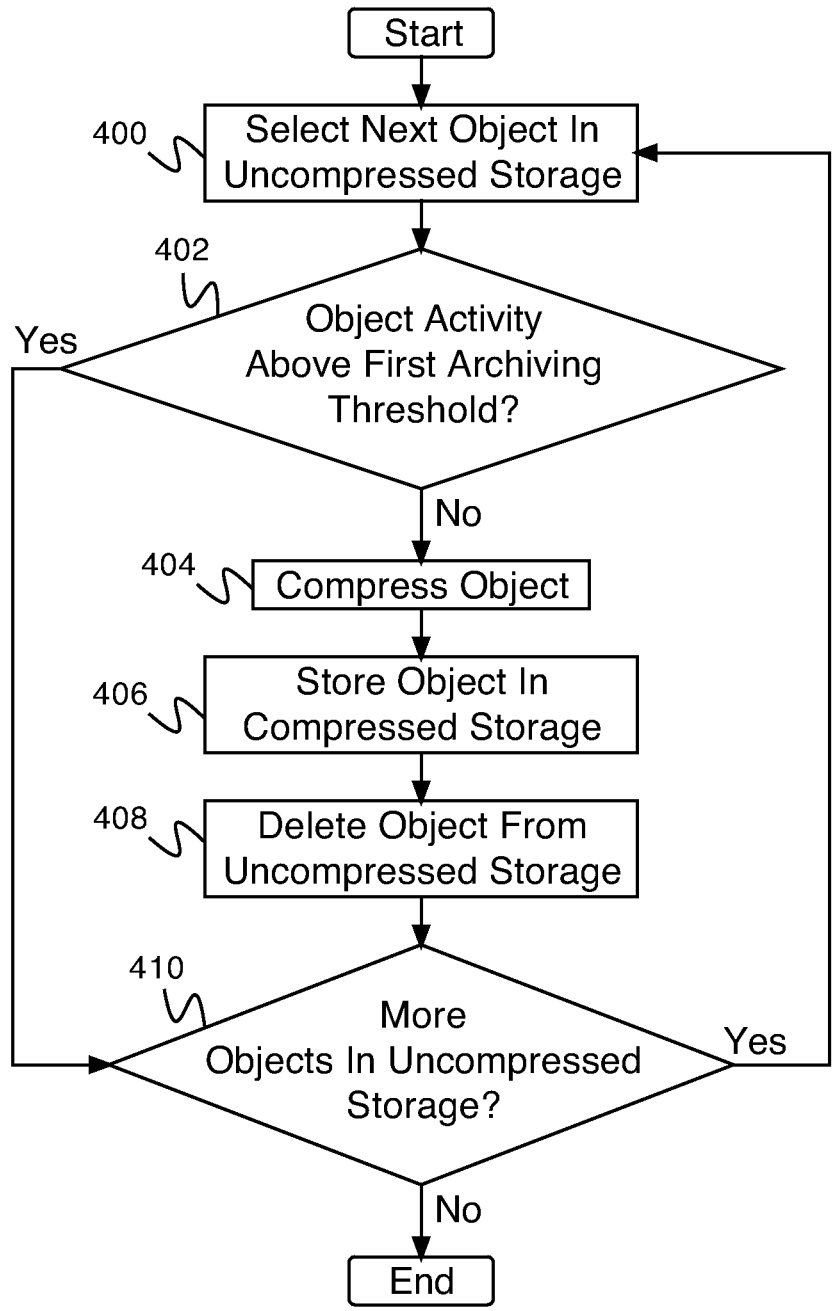
FIG. 4A is a flow diagram illustrating an embodiment of a process for removing objects from uncompressed storage.

FIG. 4A is a flow diagram illustrating an embodiment of a process for removing objects from uncompressed storage. In some embodiments, the process of FIG. 4A implements 308 of FIG. 3A. In the example shown, in 400, the next object in uncompressed storage (e.g., a data object stored in uncompressed data storage 208 of FIG. 2) is selected. In 402 it is determined whether the object activity is above the first archiving threshold. In some embodiments, determining the object activity comprises determining how often the object was accessed, e.g., over the past day, over the past week, over the past month, or over any other appropriate time period. If it was determined that the object activity is above the first archiving threshold, control passes to 410. If it was determined that the object activity is not above the first archiving threshold, control passes to 404. In 404, the object is compressed. In 406, the object is stored in compressed storage (e.g., compressed data storage 210 of FIG. 2). In 408, the object is deleted from the uncompressed storage. In some embodiments, the process of compressing an object, storing it in compressed storage, and deleting it from uncompressed storage comprises archiving an object. In 410, it is determined if there are more objects in uncompressed storage. If it is determined that there are more objects in uncompressed storage, control passes to 400. If it is determined that there are no more objects in uncompressed storage, the process ends.

Figure 4B:
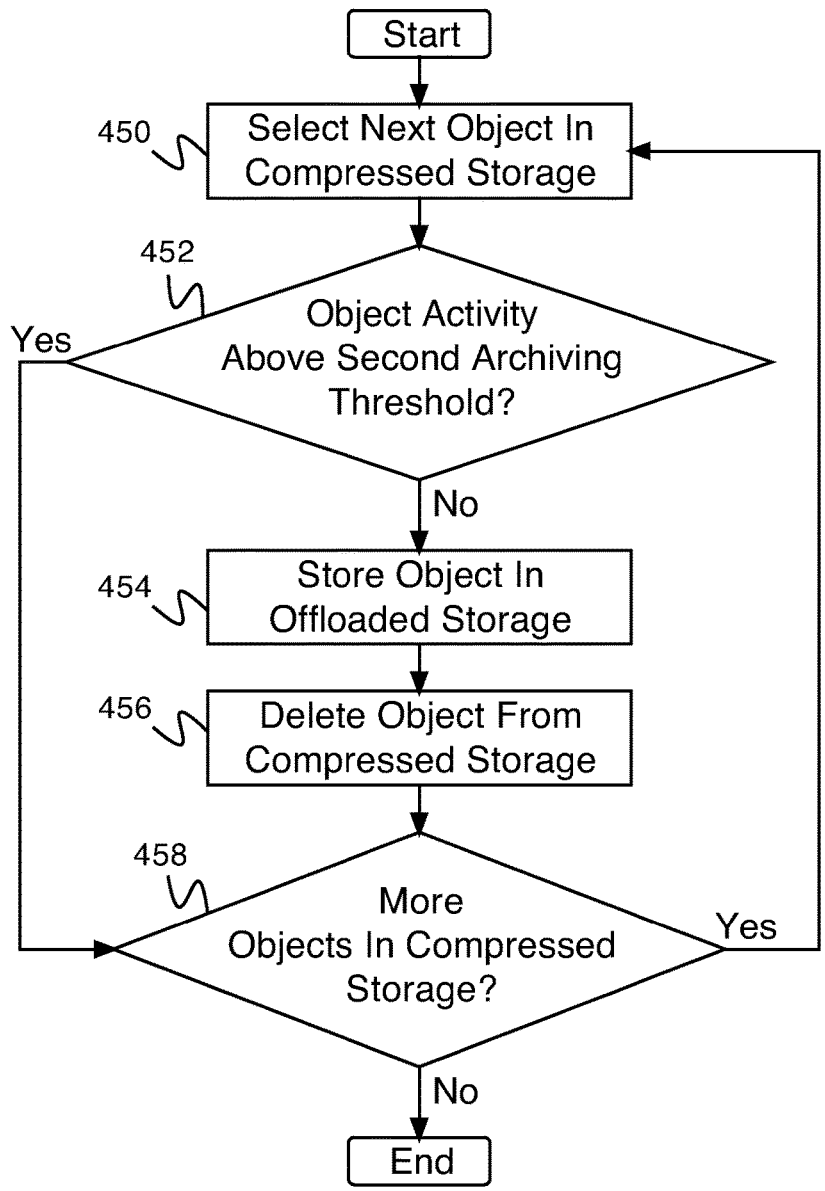
FIG. 4B is a flow diagram illustrating an embodiment of a process for removing objects from compressed storage.

FIG. 4B is a flow diagram illustrating an embodiment of a process for removing objects from compressed storage. In some embodiments, the process of FIG. 4B implements 358 of FIG. 3B. In the example shown, in 450, the next object in compressed storage (e.g., a data object stored in compressed data storage 210 of FIG. 2) is selected. In 452 it is determined whether the object activity is above the second archiving threshold. In some embodiments, determining the object activity comprises determining how often the object was accessed, e.g., over the past day, over the past week, over the past month, or over any other appropriate time period. If it was determined that the object activity is above the second archiving threshold, control passes to 458. If it was determined that the object activity is not above the second archiving threshold, control passes to 454. In 454, the object is stored in offloaded storage (e.g., offloaded data storage 214 of FIG. 2). In 456, the object is deleted from compressed storage. In some embodiments, the process of storing an object in offloaded storage and deleting it from compressed storage comprises offloading an object. In 458, it is determined if there are more objects in compressed storage. If it is determined that there are more objects in compressed storage, control passes to 450. If it is determined that there are no more objects in compressed storage, the process ends.

Figure 5A:
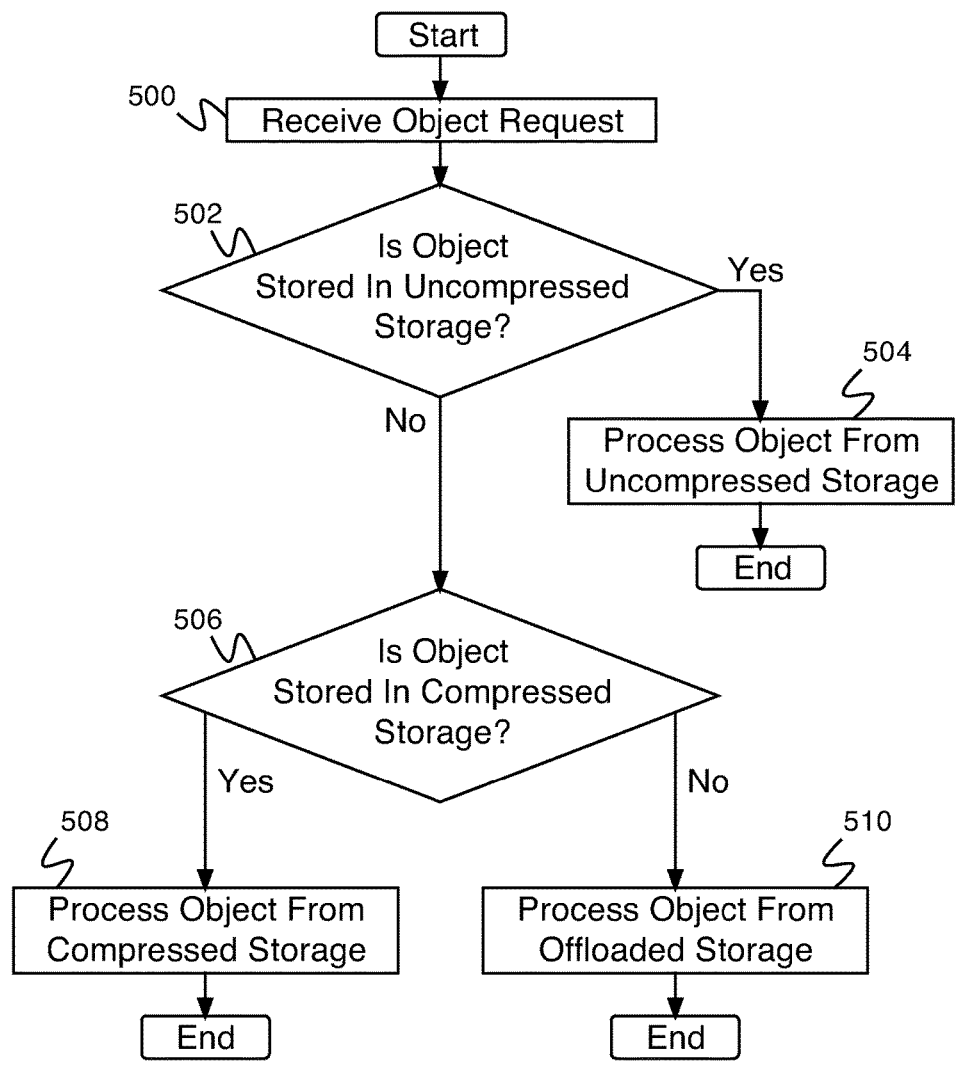
FIG. 5A is a flow diagram illustrating an embodiment of a process for processing an object request.

FIG. 5A is a flow diagram illustrating an embodiment of a process for processing an object request. In some embodiments, the process of FIG. 5A is executed by a transaction server (e.g., by transaction server 202 of FIG. 2). In the example shown, in 500, an object request is received. In some embodiments, an object request comprises a request for data from a database user (e.g., from database system user 104 of FIG. 1). In 502, it is determined whether the object is stored in uncompressed storage (e.g., in uncompressed data storage 208 of FIG. 2). In various embodiments, it is determined whether the object is stored in uncompressed storage using a data storage index, a transaction history, a server log, or using any other appropriate means. If it is determined that the object is stored in uncompressed storage, control passes to 504. In 504, the object is processed from uncompressed storage, and the process ends. If it is determined in 502 that the object is not stored in uncompressed storage, control passes to 506. In 506, it is determined if the object is stored in compressed storage. If it is determined that the object is stored in compressed storage, control passes to 508. In 508, the object is processed from compressed storage, and the process ends. If it is determined in 506 that the object is not stored in compressed storage, control passes to 510. In 510, the object is processed from offloaded storage, and the process ends.

Figure 5B:
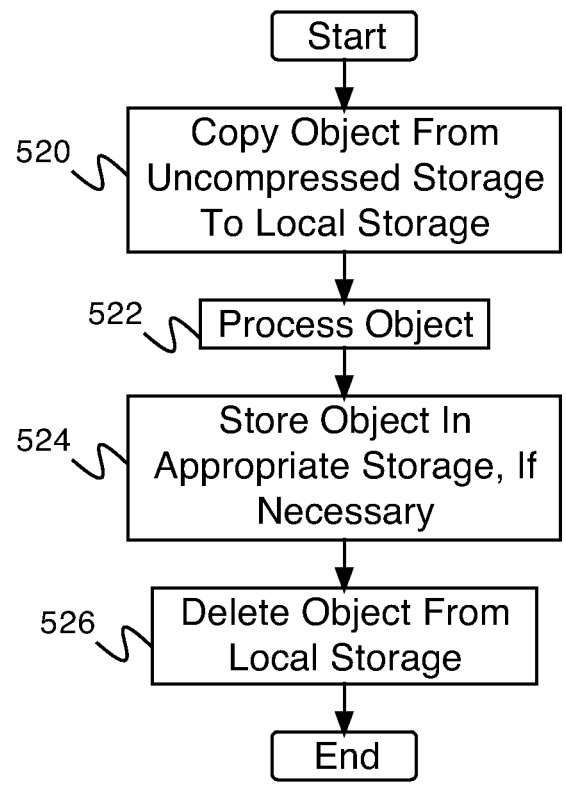
FIG. 5B is a flow diagram illustrating an embodiment of a process for processing an object from uncompressed storage.

FIG. 5B is a flow diagram illustrating an embodiment of a process for processing an object from uncompressed storage. In some embodiments, the process of FIG. 5B implements 504 of FIG. 5A. In the example shown, in 520, the object is copied from uncompressed storage (e.g., uncompressed data storage 208 of FIG. 2) to local storage (e.g., local data storage 204 of FIG. 2). In 522, the object is processed (e.g., an object request is processed.). In some embodiments, processing the object comprises modifying it. In some embodiments, processing the object does not comprise modifying it. In 524, the object is stored in the appropriate storage, if necessary. In some embodiments, it is not necessary to store the object because the object was not modified in processing. In some embodiments, it is not necessary to store the object because the object was not modified in processing and the appropriate storage is determined to be the uncompressed storage. In 526, the object is deleted from local storage.

Figure 5C:
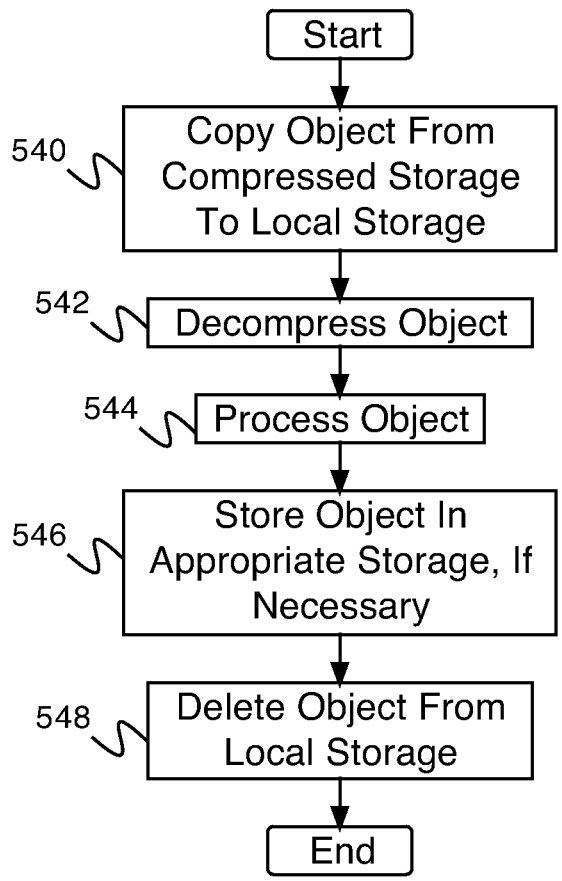
FIG. 5C is a flow diagram illustrating an embodiment of a process for processing an object from compressed storage.

FIG. 5C is a flow diagram illustrating an embodiment of a process for processing an object from compressed storage. In some embodiments, the process of FIG. 5B implements 508 of FIG. 5A. In the example shown, in 540, the object is copied from compressed storage (e.g., compressed data storage 210 of FIG. 2) to local storage (e.g., local data storage 204 of FIG. 2). In 542, the object is decompressed. In 544, the object is processed (e.g., an object request is processed.). In some embodiments, processing the object comprises modifying it. In some embodiments, processing the object does not comprise modifying it. In 546, the object is stored in the appropriate storage, if necessary. In some embodiments, it is not necessary to store the object because the object was not modified in processing. In some embodiments, it is not necessary to store the object because the object was not modified in processing and the appropriate storage is determined to be the compressed storage. In 526, the object is deleted from local storage.

Figure 5D:
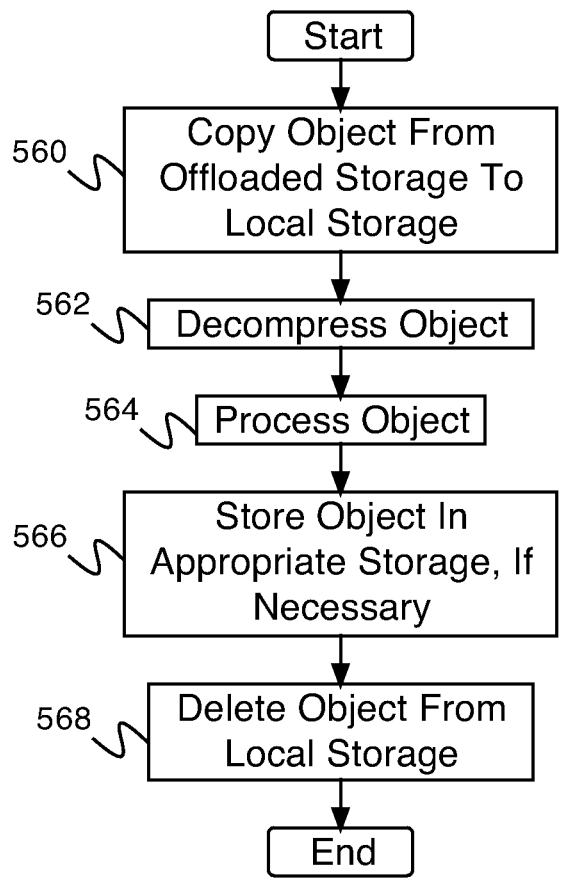
FIG. 5D is a flow diagram illustrating an embodiment of a process for processing an object from offloaded storage.

FIG. 5D is a flow diagram illustrating an embodiment of a process for processing an object from offloaded storage. In some embodiments, the process of FIG. 5B implements 510 of FIG. 5A. In the example shown, in 560, the object is copied from offloaded storage (e.g., offloaded data storage 214 of FIG. 2) to local storage (e.g., local data storage 204 of FIG. 2). In 562, the object is decompressed. In 564, the object is processed (e.g., an object request is processed.). In some embodiments, processing the object comprises modifying it. In some embodiments, processing the object does not comprise modifying it. In 566, the object is stored in the appropriate storage, if necessary. In some embodiments, it is not necessary to store the object because the object was not modified in processing. In some embodiments, it is not necessary to store the object because the object was not modified in processing and the appropriate storage is determined to be the offloaded storage. In 526, the object is deleted from local storage.

Figure 5E:
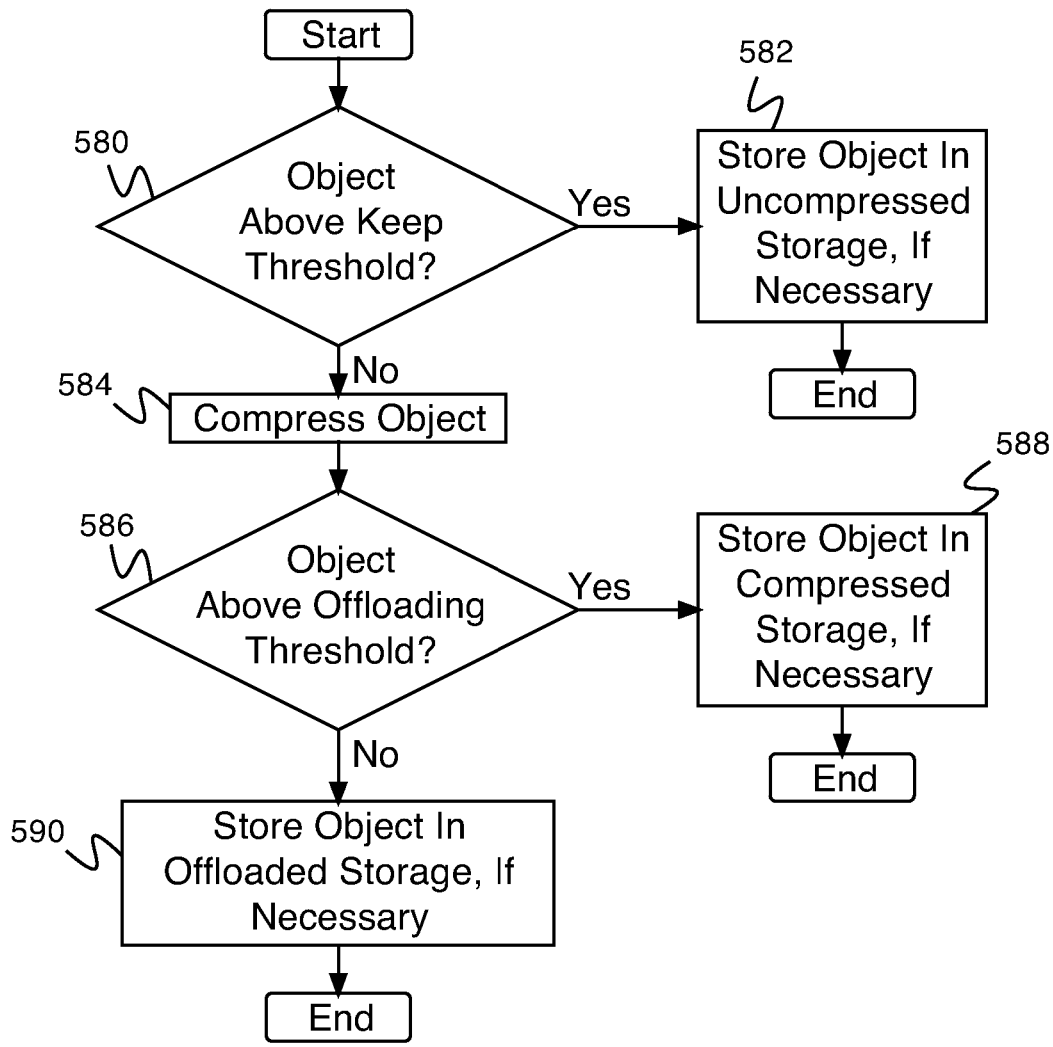
FIG. 5E is a flow diagram illustrating an embodiment of a process for storing an object in an appropriate storage, if necessary.

FIG. 5E is a flow diagram illustrating an embodiment of a process for storing an object in an appropriate storage, if necessary. In some embodiments, the process of FIG. 5E implements 524 of FIG. 5B. In some embodiments, the process of FIG. 5E implements 546 of FIG. 5C. In some embodiments, the process of FIG. 5E implements 566 of FIG. 5D. In the example shown, in 580, it is determined whether the object is above the keep threshold. In some embodiments, determining whether the object is above the keep threshold comprises determining whether the object activity is above the keep threshold. In some embodiments, it is determined whether the object is above the keep threshold using an indication stored with the object. If it is determined that the object is above the keep threshold, control passes to 582. In 582, the object is stored in uncompressed storage (e.g., uncompressed storage 208 of FIG. 2), if necessary. In some embodiments, it is not necessary to store the object in uncompressed storage if the object is already stored in identical form in uncompressed storage. If it is determined in 580 that the object is not above the keep threshold, control passes to 584. In 584, the object is compressed. In 586, it is determined whether the object is above the offloading threshold. In some embodiments, determining whether the object is above the offloading threshold comprises determining whether the object activity is above the offloading threshold. In some embodiments, it is determined whether the object is above the offloading threshold using an indication stored with the object. If it is determined that the object is above the offloading threshold, control passes to 588. In 588, the object is stored in compressed storage (e.g., compressed storage 210 of FIG. 2), if necessary. In some embodiments, it is not necessary to store the object in compressed storage if the object is already stored in identical form in compressed storage. If it is determined in 586 that the object is not above the offloading threshold, control passes to 590. In 590, the object is stored in offloaded storage (e.g., offloaded storage 214 of FIG. 2), if necessary. In some embodiments, it is not necessary to store the object in offloaded storage if the object is already stored in identical form in offloaded storage.

Figure 6:
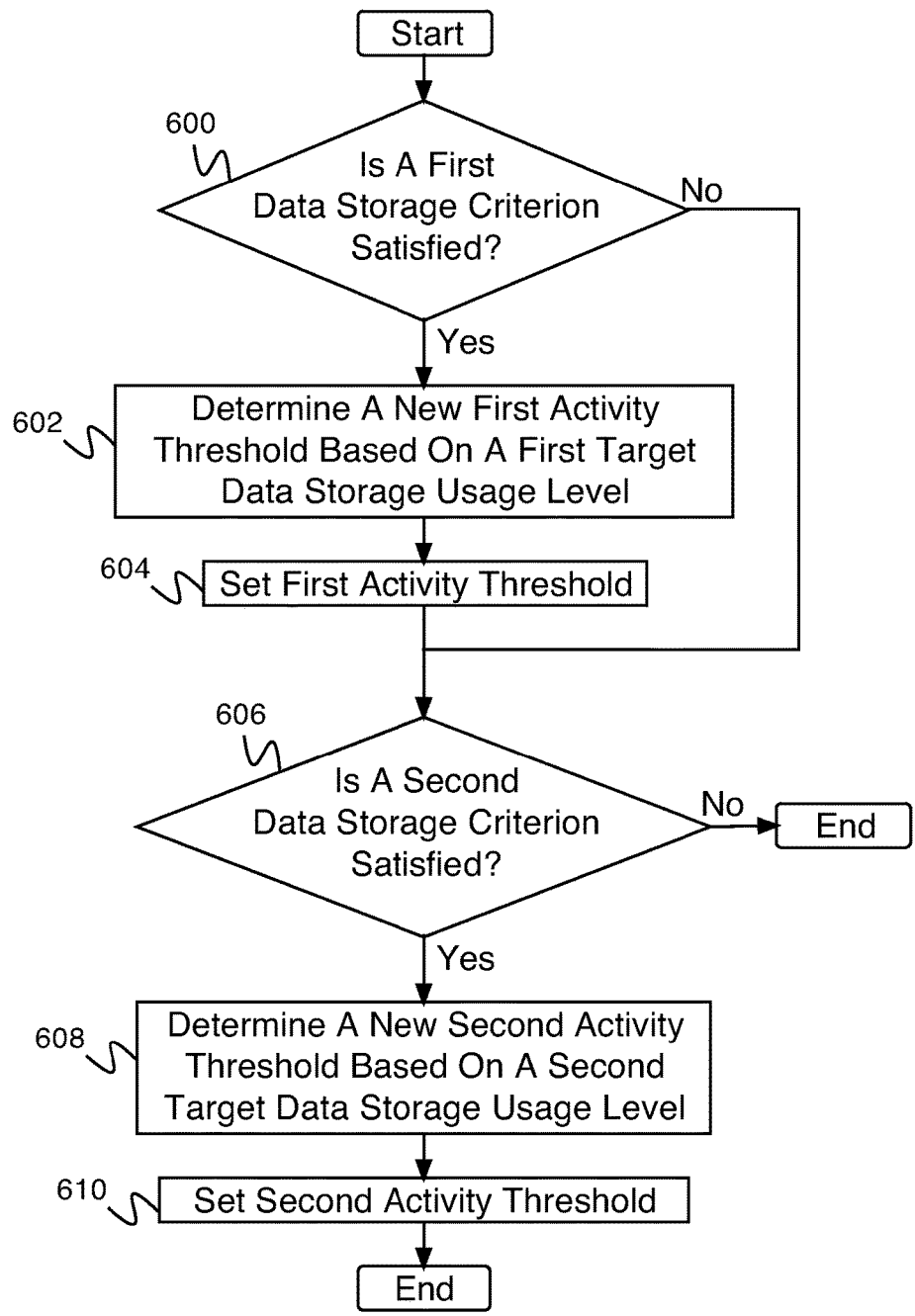
FIG. 6 is a flow diagram illustrating an embodiment of a process for dynamically utilizing data storage.

FIG. 6 is a flow diagram illustrating an embodiment of a process for dynamically utilizing data storage. In some embodiments, the process of FIG. 6 is executed by a transaction server (e.g., transaction server 202 of FIG. 2). In the example shown, in 600, it is determined whether a first data storage criterion is satisfied. In some embodiments, determining whether a first data storage criterion is satisfied comprises determining whether the amount of data stored in a data storage exceeds a threshold. If it is determined that the data storage criterion is not satisfied, control passes to 606. If it is determined that the first data storage criterion is satisfied, control passes to 602. In 602, a new first activity threshold is determined based on a first target data storage usage level. In some embodiments, the new first activity threshold comprises a first archiving threshold. In some embodiments, the new first activity threshold comprises a keep threshold. In some embodiments, the first target data storage usage level comprises an uncompressed data storage level. In 604, the first activity threshold is set (e.g., the new first activity threshold is stored as the current first activity threshold).

In 606, it is determined whether a second data storage criterion is satisfied. In some embodiments, determining whether a second data storage criterion is satisfied comprises determining whether the amount of data stored in a data storage exceeds a threshold. If it is determined that the second data storage criterion is not satisfied, the process ends. If it is determined that the second data storage criterion is satisfied, control passes to 608. In 608, a new second activity threshold is determined based on a second target data storage usage level. In some embodiments, the new second activity threshold comprises a second archiving threshold. In some embodiments, the new second activity threshold comprises an offloading threshold. In some embodiments, the second target data storage usage level comprises a compressed data storage level. In 610, the second activity threshold is set (e.g., the new second activity threshold is stored as the current second activity threshold).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for dynamically utilizing data storage, comprising:
    determining, using a processor, whether uncompressed storage of a server is above an uncompressed storage threshold, comprising determining whether a system performance metric satisfies a system performance metric criterion, wherein the system performance metric is based at least in part on a system processing capability comprising one or more of a transaction processing rate, and a calculation speed; and
    in response to the uncompressed storage being above the uncompressed storage threshold:
        determining an amount of uncompressed data to remove for the uncompressed storage to meet an uncompressed storage target, wherein the uncompressed storage target is determined to achieve a system performance metric target;
        determining an archiving threshold to remove the amount of uncompressed data, wherein the archiving threshold is an activity threshold;
        setting the archiving threshold;
        determining at least one data object that satisfies the archiving threshold and space to store the at least one data object in parallel;
        removing data objects from the uncompressed storage based at least in part on the archiving threshold to achieve the system performance metric target; and
        discarding a data object of the data objects in response to a determination that an object activity of the data object is below an offloading threshold associated with a first compressed storage of the server, and a copy of the data object is stored in a second compressed storage of the server, wherein the server comprises design-time metadata and runtime metadata.

2. A computer program product for dynamically utilizing data storage, the computer program product being embodied in a tangible non-transitory computer readable storage medium and comprising computer instructions for:
    determining, using a processor, whether uncompressed storage of a server is above an uncompressed storage threshold, comprising determining whether a system performance metric satisfies a system performance metric criterion, wherein the system performance metric is based at least in part on a system processing capability comprising one or more of a transaction processing rate, and a calculation speed; and
    in response to the uncompressed storage being above the uncompressed storage threshold:
        determining an amount of uncompressed data to remove for the uncompressed storage to meet an uncompressed storage target, wherein the uncompressed storage target is determined to achieve a system performance metric target;
        determining an archiving threshold to remove the amount of uncompressed data, wherein the archiving threshold is an activity threshold;
        setting the archiving threshold;

determining at least one data object that satisfies the archiving threshold and space to store the at least one data object in parallel;

removing data objects from the uncompressed storage based at least in part on the archiving threshold to achieve the system performance metric target; and discarding a data object of the data objects in response to a determination that an object activity of the data object is below an offloading threshold associated with a first compressed storage of the server, and a copy of the data object is stored in a second compressed storage of the server, wherein the server comprises design-time metadata and runtime metadata.

3. A system for dynamically utilizing data storage, comprising:

a processor configured to:

determine whether uncompressed storage of a server is above an uncompressed storage threshold, comprising determining whether a system performance metric satisfies a system performance metric criterion, wherein the system performance metric is based at least in part on a system processing capability comprising one or more of a transaction processing rate, and a calculation speed; and in response to the uncompressed storage being above the uncompressed storage threshold:

determine an amount of uncompressed data to remove for the uncompressed storage to meet an uncompressed storage target, wherein the uncompressed storage target is determined to achieve a system performance metric target;

determine an archiving threshold to remove the amount of uncompressed data, wherein the archiving threshold is an activity threshold;

set the archiving threshold;

determine at least one data object that satisfies the archiving threshold and space to store the at least one data object in parallel;

remove data objects from the uncompressed storage based at least in part on the archiving threshold to achieve the system performance metric target; and discard a data object of the data objects in response to a determination that an object activity of the data object is below an offloading threshold associated with a first compressed storage of the server, and a copy of the data object is stored in a second compressed storage of the server, wherein the server comprises design-time metadata and runtime metadata; and a memory coupled to the processor and configured to provide the processor with instructions.

4. The system as in claim 3, wherein the processor is further configured to determine whether the object activity is above the archiving threshold.

5. The system as in claim 4, wherein the processor is further configured to compress the data object to obtain a compressed data object in response to the object activity being not above the archiving threshold.

6. The system as in claim 5, wherein the processor is further configured to store the compressed data object in the first compressed storage in response to a determination that the object activity is not below the offloading threshold.

7. The system as in claim 5, wherein the processor is further configured to store the compressed data object in the second compressed storage in response to an offloading determination that the object activity is below the offloading threshold, and a copy of the data object is not stored in the second compressed storage.

8. The system as in claim 3, wherein the processor is further configured to determine whether the first compressed storage is above a compressed storage threshold.

9. The system as in claim 8, wherein the processor is further configured to determine an amount of compressed data to remove for the first compressed storage to meet a compressed storage target.

10. The system as in claim 8, wherein the processor is further configured to remove compressed data objects from the compressed storage.

11. The system as in claim 9, wherein the archiving threshold is a first archiving threshold, wherein the processor is further configured to determine a second archiving threshold to remove the amount of compressed data to meet the compressed storage target.

12. The system as in claim 11, wherein the processor is further configured to set the second archiving threshold.

13. The system as in claim 12, wherein the processor is further configured to determine whether an object activity of a selected data object is above the second archiving threshold.

14. The system as in claim 13, wherein the processor is further configured to store the selected data object in offloaded storage in the event that the object activity of the selected data object is not above the second archiving threshold.

15. The system as in claim 14, wherein the processor is further configured to delete the selected data object from the compressed storage.

16. The system as in claim 3, wherein the processor is further configured to receive a data object request.

17. The system as in claim 16, wherein the processor is further configured to determine whether a requested data object associated with the data object request is stored in the uncompressed storage.

18. The system as in claim 17, wherein in response to the requested data object being stored in the uncompressed storage, the processor is further configured to process the requested data object from the uncompressed storage.

19. The system as in claim 17, wherein in response to the requested data object being not stored in the uncompressed storage, the processor is further configured to determine whether the requested data object is stored in the first compressed storage or the second compressed storage.

20. The system as in claim 19, wherein in response to the requested data object being stored in the first compressed storage of the second compressed storage, the processor is further configured to process the requested data object from the first compressed storage or the second compressed storage.

* * * * *